Patented Oct. 17, 1944

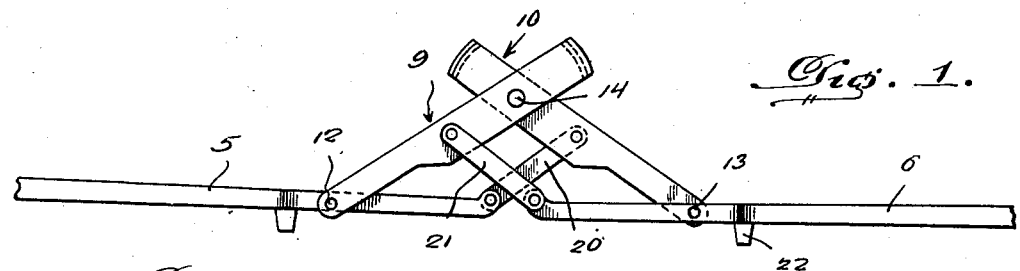
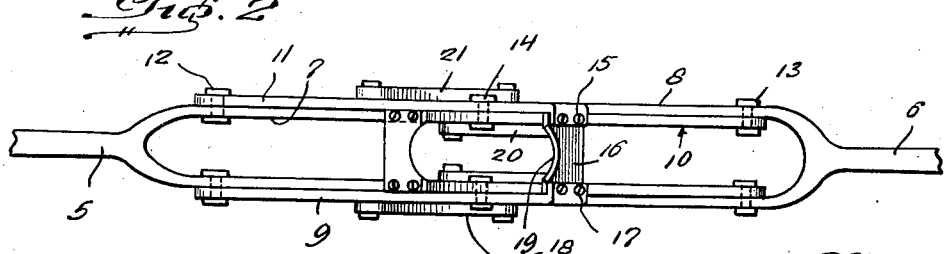
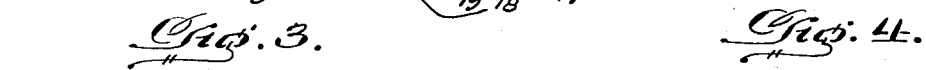
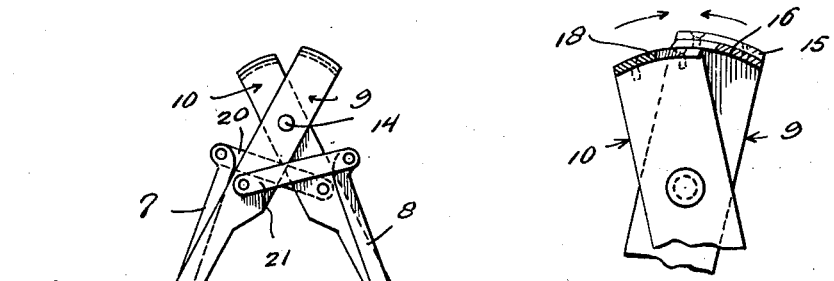
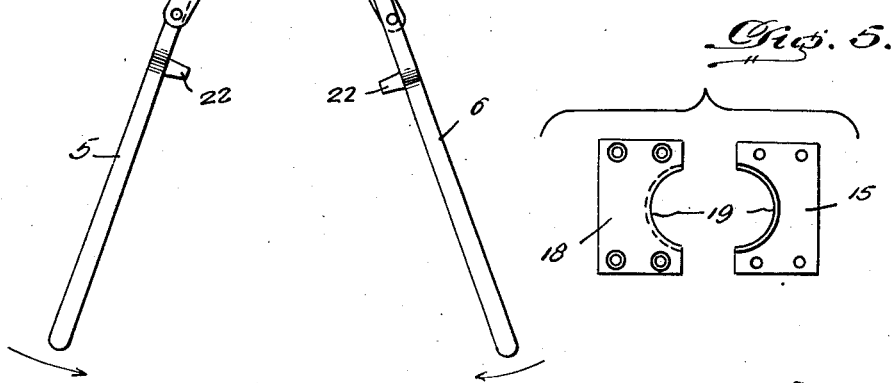

2,360,441

UNITED STATES PATENT OFFICE 2,360,441

CATTLE DEHORNER

Carl R. Nelson, Kansas City, Mo.

Application April 20, 1944, Serial No. 531,945

2 Claims. (Cl. 30—229)

The present invention relates to new and useful improvements in cattle dehorners, and has for its primary object to provide a tool of this character adapted for severing the horn with as little exertion to the operator as possible, and which will make a clean, positive cut without unnecessary pain to the cattle.

More specifically, the invention embodies a pair of pivoted cutting members cooperating to engage and sever the horn, together with handle extensions for each of the cutting members and in which each handle is operatively connected to each of the cutting members and arranged to exert pressure thereon during the cutting action.

A further object of the invention is to provide detachable blades for each of the cutting members adapted for convenient replacement, when desired.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts hereof, in which:

Figure 1 is a side elevational view.

Figure 2 is a fragmentary top plan view.

Figure 3 is a side elevational view showing the cutting members and handles moved into closed position.

Figure 4 is a fragmentary sectional view through the blades of the cutting members.

Figure 5 is a group plan view of the removable cutting blades.

Referring now to the drawing in detail, the numerals 5 and 6 designate a pair of handles having U-shaped inner ends 7 and 8, respectively, the U-shaped inner end 8 of the handle 6 being wider than the U-shaped inner end 7 of the handle 5.

The cutting members are designated at 9 and 10 and each is composed of a pair of spaced parallel arms 11, the arms of the cutting member 9 being pivoted by pins 12 to the outside of the U-shaped inner end 7 of the handle 5 while the arms of the cutting member 10 are pivoted on pins 13 to the inside of the U-shaped inner end 8 of the handle 6. The arms of the cutting members 9 and 10 extend in crossed relation and are pivotally connected to each other by pins 14.

The free ends of each of the arms are formed with inturned flanges 15 and to the under side of the flanges of the cutting member 9 is secured a blade 16 by means of countersunk screws 17 while a blade 18 is similarly secured to the outer surfaces of the flanges of the cutting member 10. The opposed edges of the blades 16 and 18 are curved, as shown at 19, and cooperate to engage opposite sides of the horn of the cattle.

The blade 16 is adapted to ride over the blade 18, as shown in Figure 4 of the drawing, and the curved cutting edges 19 of the blade are oppositely beveled to more effectively carry out the cutting action.

The inner ends of the U-shaped inner portion of the handle 5 are connected to the respective arms of the cutting member 10 by means of pivoted links 20 while the inner ends of the U-shaped portion 8 of the handle 6 are similarly connected to the arms of the cutting member 9 by pivoted links 21.

In the operation of the tool, the cutting blades 16 and 18 of the cutting members 9 and 10 are moved into open position when the handles 5 and 6 are moved away from each other, as shown in Figure 1 of the drawing, and by moving the handles 5 and 6 in the direction toward each other, the blades of the cutting members will be closed, as shown in Figure 3, and by reason of the connection of the handles with both of the cutting members, a compound cutting force is produced on the cutting members which will reduce the force required to close the cutting members to effectively cut the horn.

Resilient bumpers 22 are attached to the inner edges of the handles 5 and 6 to provent complete closing of the handles and avoid injury to the fingers of the user.

The construction of this device and especially the shape of the blades will permit the operator of the device to cut the horns at the base thereof or close to the head of the animal which will prevent the animal from again growing horns.

The details of construction, advantages and manner of use of the tool will be readily understood from the foregoing without further detailed explanation.

Having thus described the invention, what I claim is:

1. A cattle dehorner comprising a pair of cutting members each composed of a pair of spaced parallel arms, the arms of the respective members being arranged in crossed relation and pivotally connected to each other, inturned flanges at the outer ends of the arms, blades removably attached to the flanges and having cooperating cutting edges, and a pair of manipulating handles for the cutting members, each handle being operatively connected to both cutting members.

2. A cattle dehorner comprising a pair of cutting members each composed of a pair of spaced parallel arms, the arms of the respective members being arranged in crossed relation and pivotally connected to each other, inturned flanges at the outer ends of the arms, blades removably attached to the flanges and having cooperating cutting edges, a pair of handles each having a U-shaped inner end pivotally connected to the inner ends of the arms of the respective cutting members at a point inwardly of the end of the handle, and links pivotally connecting the inner ends of the handle to the arms of an opposite cutting member.

CARL R. NELSON.